Figure 1:
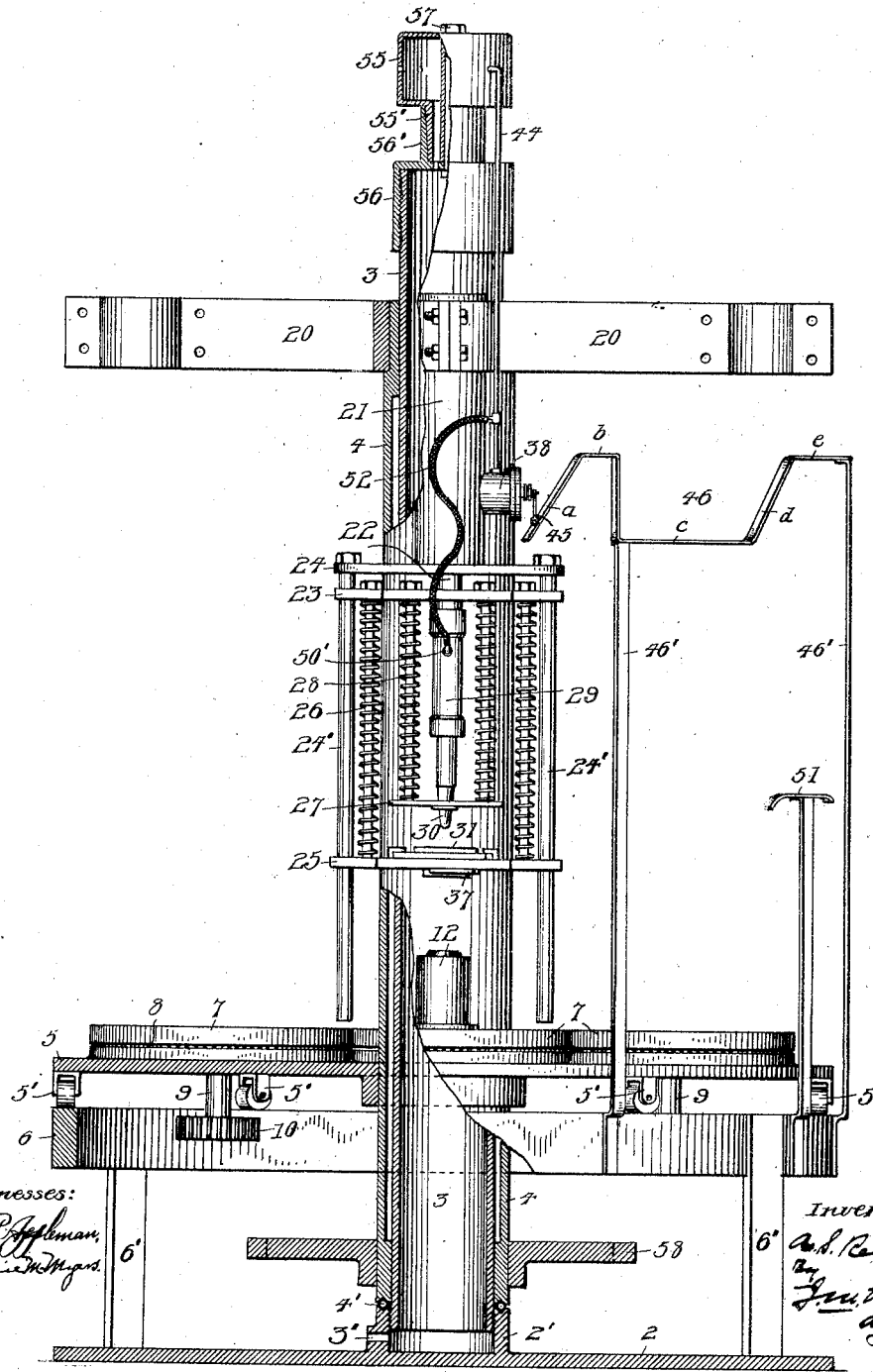

No. 854,236. PATENTED MAY 21, 1907.
A. S. REICHEL.
MACHINE FOR MANUFACTURING GLASSWARE.
APPLICATION FILED JULY 17, 1905.

7 SHEETS—SHEET 1.

Witnesses:
Inventor

No. 854,236. PATENTED MAY 21, 1907.
A. S. REICHEL.
MACHINE FOR MANUFACTURING GLASSWARE.
APPLICATION FILED JULY 17, 1905.

7 SHEETS—SHEET 2.

No. 854,236. PATENTED MAY 21, 1907.
A. S. REICHEL.
MACHINE FOR MANUFACTURING GLASSWARE.
APPLICATION FILED JULY 17, 1905.

7 SHEETS—SHEET 3.

Witnesses:

Inventor
A. S. Reichel

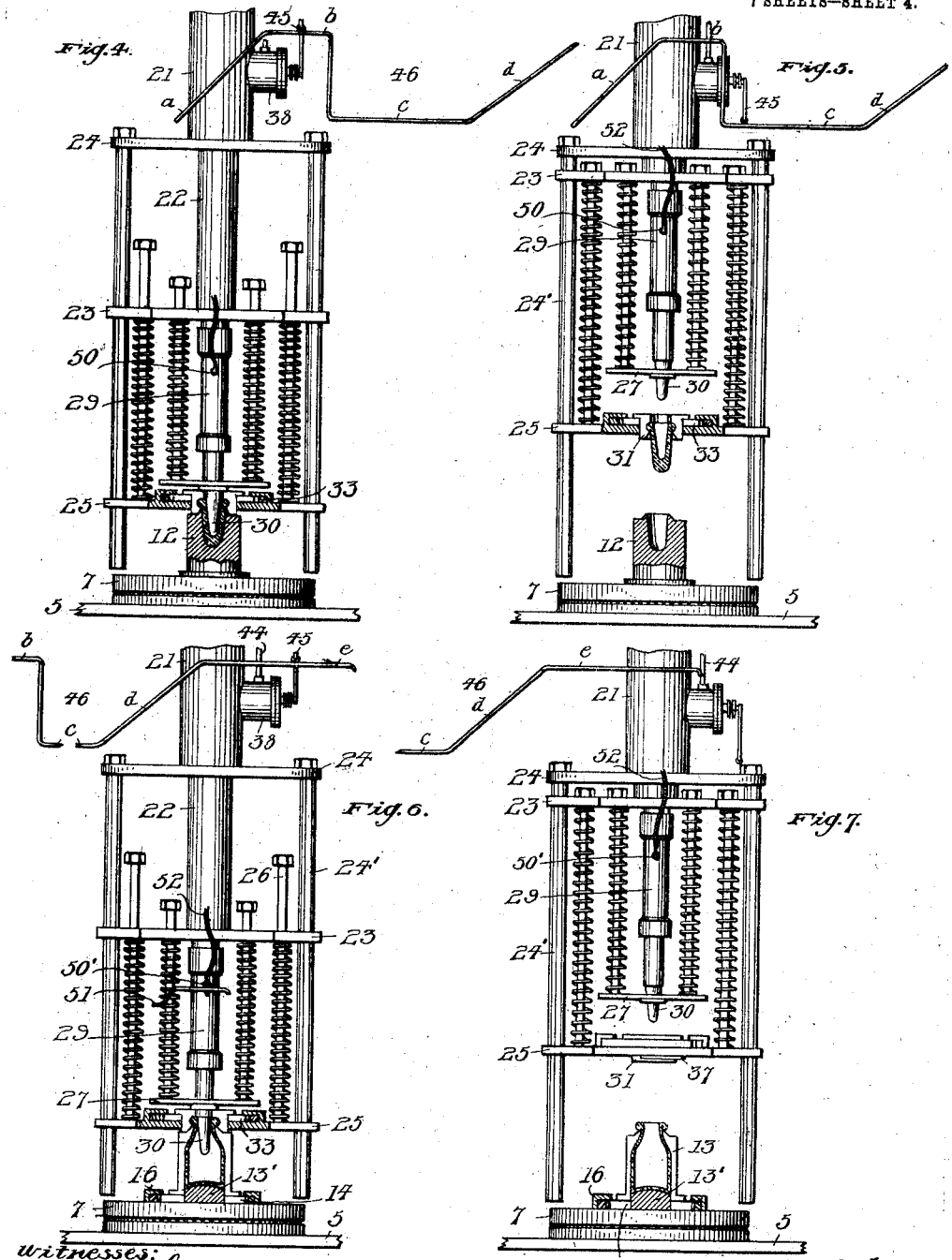

No. 854,236. PATENTED MAY 21, 1907.
A. S. REICHEL.
MACHINE FOR MANUFACTURING GLASSWARE.
APPLICATION FILED JULY 17, 1905.
7 SHEETS—SHEET 5.
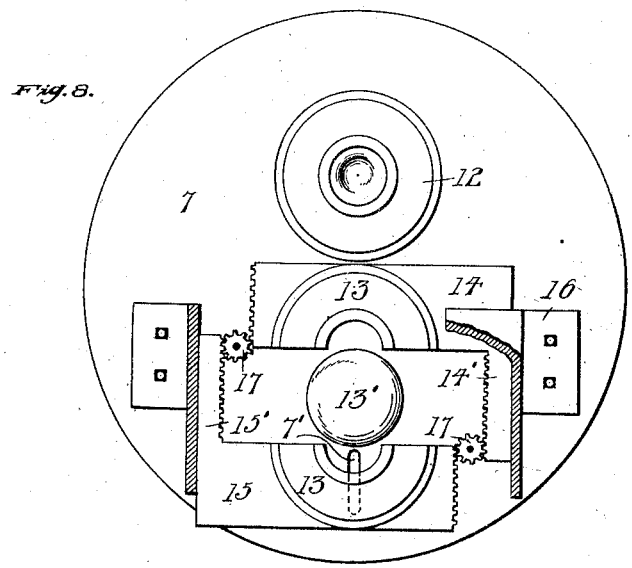
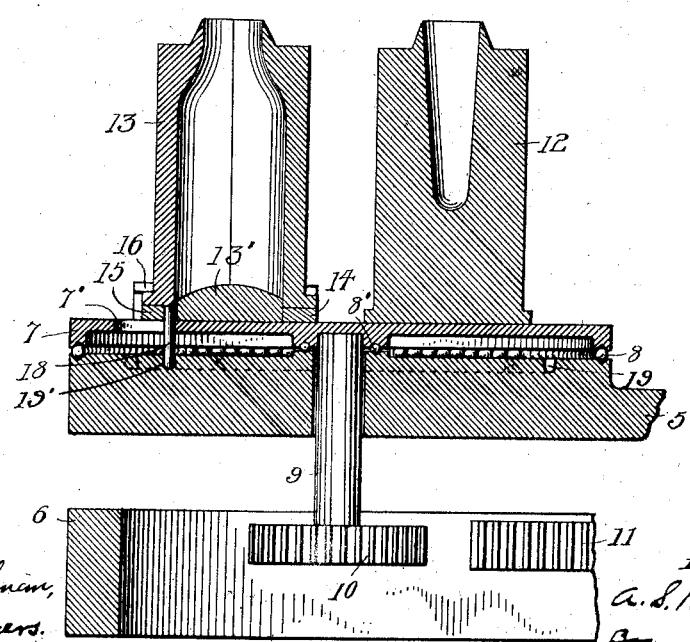

No. 854,236. PATENTED MAY 21, 1907.
A. S. REICHEL.
MACHINE FOR MANUFACTURING GLASSWARE.
APPLICATION FILED JULY 17, 1905.

7 SHEETS—SHEET 6.

No. 854,236. PATENTED MAY 21, 1907.
A. S. REICHEL.
MACHINE FOR MANUFACTURING GLASSWARE.
APPLICATION FILED JULY 17, 1905.
7 SHEETS—SHEET 7.
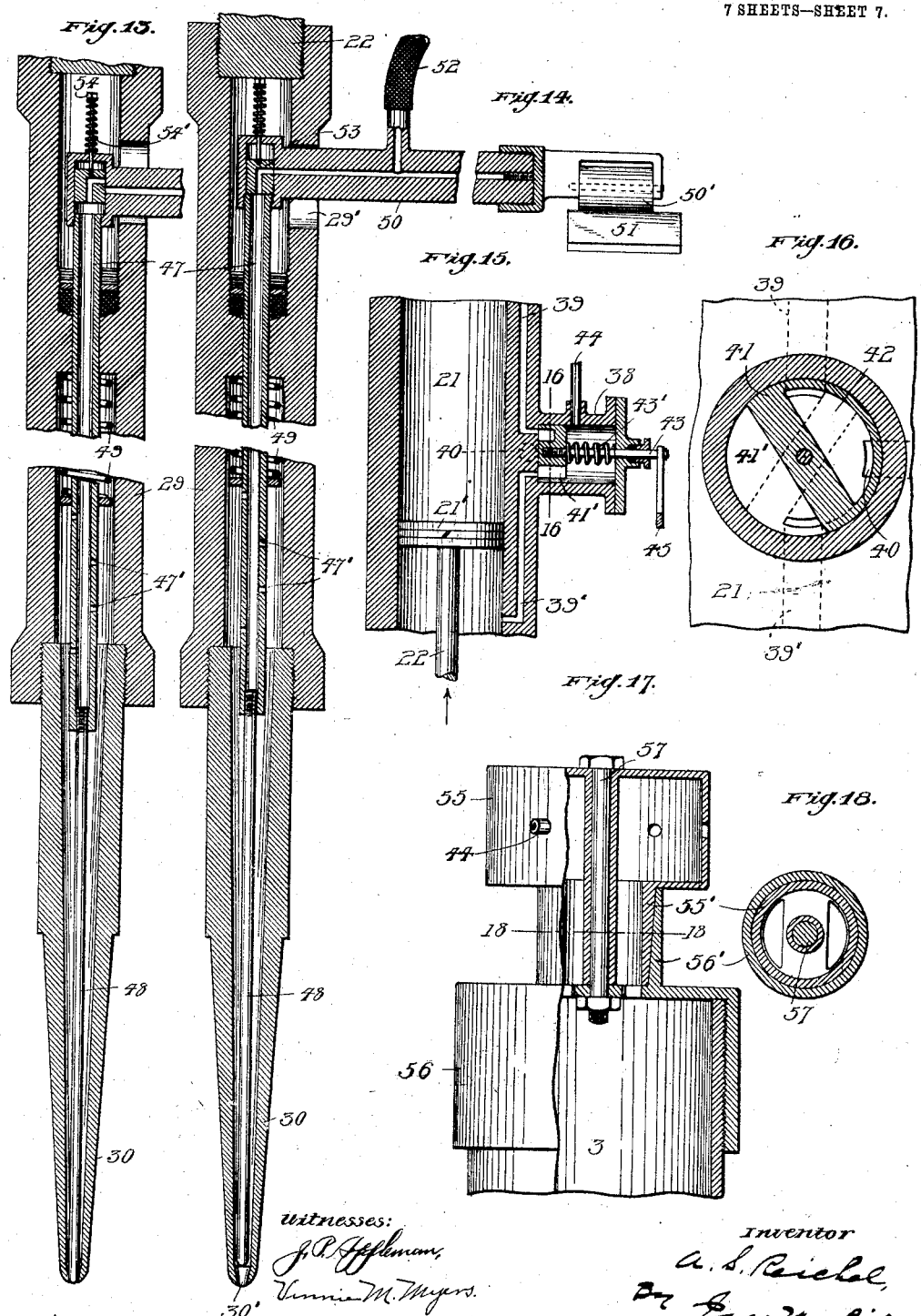

UNITED STATES PATENT OFFICE.

ALVIN S. REICHEL, OF POINT MARION, PENNSYLVANIA, ASSIGNOR OF ONE-THIRD TO WILLIAM H. SMART AND ONE-THIRD TO MONTIE LEE TITUS, OF POINT MARION, PENNSYLVANIA.

MACHINE FOR MANUFACTURING GLASSWARE.

No. 854,236.      Specification of Letters Patent.      Patented May 21, 1907.

Application filed July 17, 1905. Serial No. 270,043.

*To all whom it may concern:*

Be it known that I, ALVIN S. REICHEL, a citizen of the United States, residing at Point Marion, in the county of Fayette and State of Pennsylvania, have invented certain new and useful Improvements in Machines for Manufacturing Glassware, of which the following is a specification, reference being had therein to the accompanying drawings.

This invention relates to that class of machines for manufacturing glassware wherein the article is partially formed by pressing and is then blown into finished form, and the primary object is to provide an improved machine of simple construction for performing the forming operations rapidly, accurately, and uniformly.

While the improved machine may be utilized for manufacturing various kinds of hollow ware, it is designed especially for the production of bottles.

While the invention belongs to that general type of pressing and blowing machines wherein the molds are mounted upon a horizontally movable carrier and coöperate with vertically movable pressing and blowing mechanism, it differs primarily from machines of former construction in having the forming mechanism move in unison with the mold-carrier, and in having the pressing and blowing operations take place while the forming mechanism and carrier are thus moving.

A further distinctive characteristic is that the advancing movement of the carrier operates to move the press-mold out of operative position and the blow-mold into operative position between the pressing and blowing operations, with the result that the entire mechanism is advancing from the beginning to the end of the forming operation.

The improved machine is preferably embodied in a circular series of independently operating mechanisms, the number of which may be varied as required to secure the best and most economical results.

Figure 2:
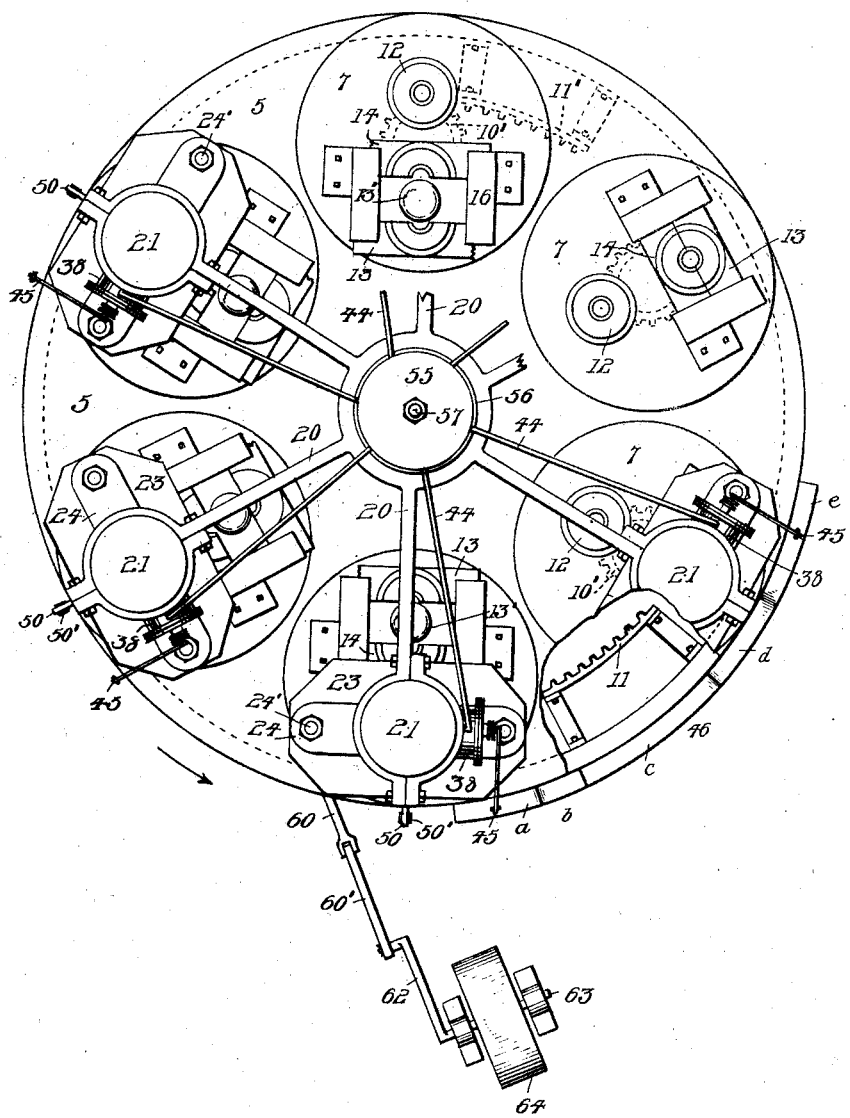
Figure 3:
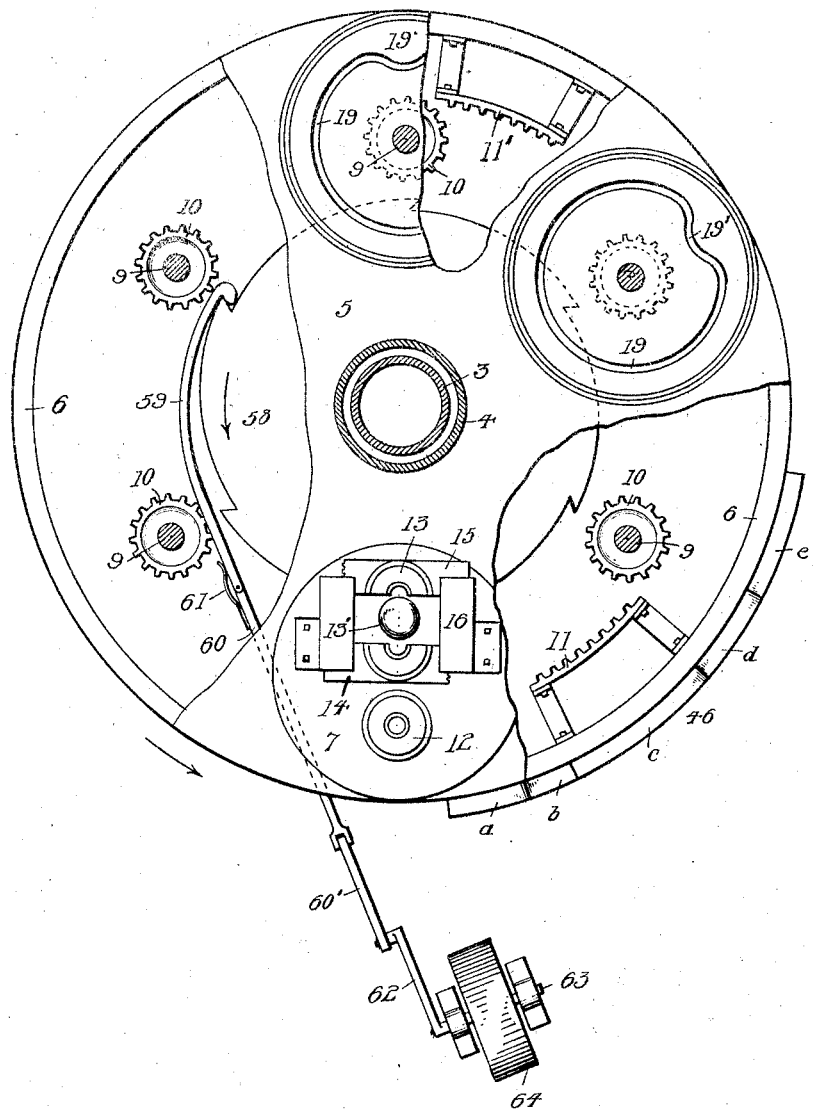
Figure 10:
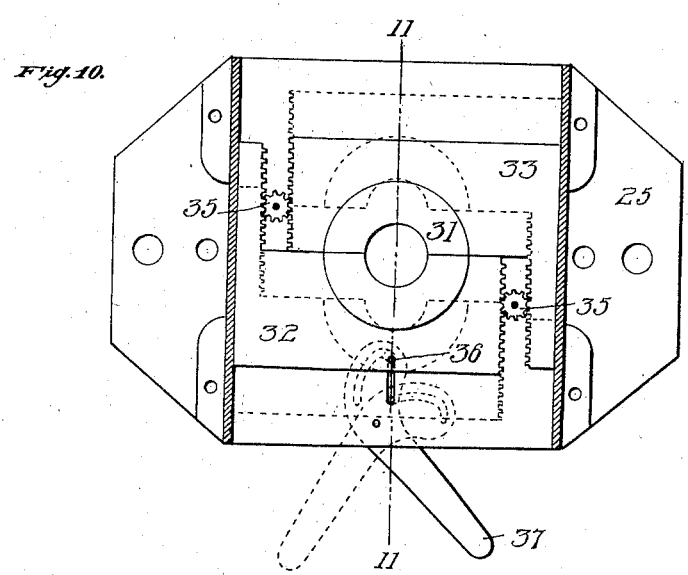
Figure 11:
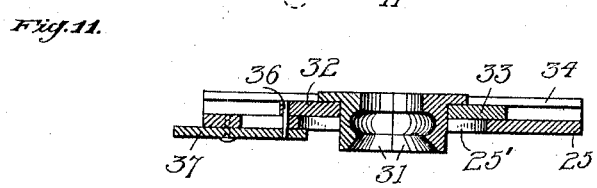
Figure 12:
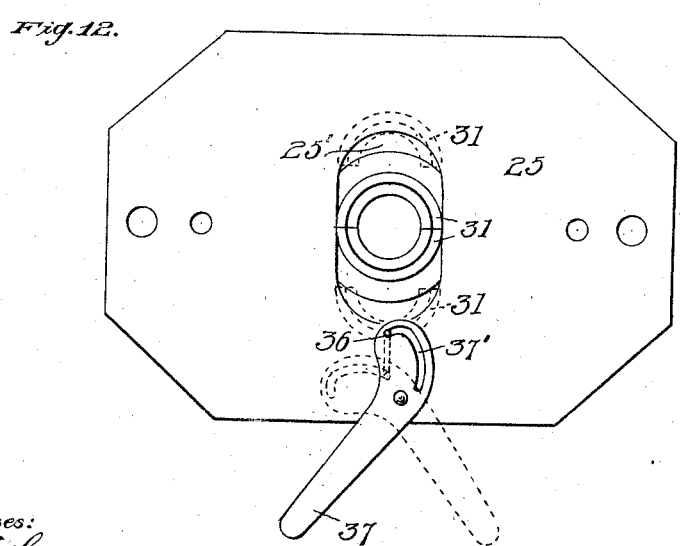

In the accompanying drawings, Figure 1 is a side elevation, partly in section, of the improved machine, only one of the forming mechanisms being shown. Fig. 2 is a top plan view, portions of the mechanism being broken away, and Fig. 3 is a similar view with still more of the mechanism broken away. Figs. 4, 5, 6 and 7 are side views of portions of the machine, showing the relative positions of parts during the successive steps of the forming operation. Fig. 8 is a plan view of one of the rotatable mold-supports, and Fig. 9 is a vertical sectional view of the same. Fig. 10 is a plan view of the neck-mold mechanism, and Fig. 11 is a cross-sectional view, taken on line 11—11 of Fig. 10. Fig. 12 is an inverted plan view of the same. Fig. 13 is a vertical sectional view of the plunger, showing the relative positions of its parts when pressing, and Fig. 14 is a similar view of the same when blowing. Fig. 15 is a sectional view of a portion of the cylinder and valve, and Fig. 16 is a cross-sectional view taken on line 16—16 of Fig. 15. Fig. 17 is a sectional view of the swivel air-connection at the upper end of the central reservoir and Fig. 18 is a sectional view, taken on line 18—18 of Fig. 17.

In the embodiment of the invention herein disclosed, a base 2 is formed with a central hollow boss 2', and uniting therewith is upright cylinder 3, which comprises an air-reservoir to which air under pressure is admitted through connection 3' from any suitable source. Inclosing and rotatable around cylinder 3 is tubular post 4 having a ball-bearing 4' interposed between its lower end and boss 2'. Secured to this post is the circular carrier or table 5, the periphery of which is provided with casters 5' which travel on the ring-like frame 6, supported by standard 6' rising from the base.

7 designates the circular mold-supports which are arranged in a circular series on carrier 5. Each of these supports is rotatably mounted on ball-bearings 8 and 8', and depending from the center thereof is a stem 9 carrying at its lower end gear-wheel 10 which is adapted to mesh with racks 11 and 11' supported by frame 6. Carried by each of supports 7, at opposite sides of its center, is a press-mold 12 and a divided blow-mold 13. The sections of the latter are mounted on slides 14 and 15, respectively, movable in guides 16 secured to support 7. Each of these slides is formed at one end with a laterally extending arm 14' 15', respectively, each of which overlaps the unextended end of the other slide. The adjacent faces of said extensions and the slide-ends are formed with gear-teeth, as shown, and interposed therebetween are the gears 17. A pin 18 projects downward from slide 15 through slot 7' in carrier 7 and into groove 19 in carrier 5, said groove having an inward offset 19'. Thus, through the medium of the interposed gears, the slides are caused to move simultaneously in opposite directions for either opening or closing the mold-sections around mold-bottom 13'. With pin 18 in the main portion of groove 19, the mold is open, but the passage thereof into offset 19' closes the mold and holds it closed until the pin emerges therefrom.

Secured to and radiating from the upper end of tubular post 4 is a series of arms 20 which support the upright cylinders 21, each of which overhangs a mold-support 7. Within each cylinder is a piston 21' from which depends a rod 22, and secured to this piston-rod is the upper plate 23 of the spring-plate mechanism. Secured to the lower end of cylinder 21 is head 24 from which depend the guide-rods 24' upon which plate 23 moves, likewise lower plate 25 of the spring-plate mechanism carried by the lower ends of rods 26 depending from plate 23, plate 25 carrying the neck-mold mechanism, presently to be described. An intermediate spring-plate 27, suspended on rods 28 from plate 23, bears downward upon the neck-mold during the pressing and blowing operations, as seen in Figs. 4 and 6. Vertical compression of the spring-plate mechanism, or in other words, upward movement of plates 25 and 27 toward plate 23, is resisted by the coiled-springs on the plate-suspending rods, which are arranged and operate in the usual manner. Secured to the lower end of piston-rod 22 is the plunger-cylinder 29, from the lower end of which extends the hollow plunger 30, the latter closely fitting an aperture in plate 27, and having an opening 30' in its lower end.

The neck-mold mechanism, carried by plate 25, consists of the divided neck-mold sections 31, of such formation as to closely fit and form upward continuations of the cavities of press-mold 12 and blow-mold 13, respectively. The blow-mold sections are secured to slides 32 and 33 movable in guides 34 on plate 25, the slides being of the same formation as the blow-mold supporting slides, described above, and provided with corresponding interposed gears 35, whereby they open and close in unison when either one of the slides is actuated. Depending from slide 32 is a pin 36 which projects into the cam-groove 37' of lever 37, fulcrumed to the lower-side of plate 25. Thus, movement of the lever in one direction operates to separate the slides and open the neck-mold, while movement in a reverse direction closes the mold and so holds it as to resist opening movement exerted other than through the medium of the lever. The mold-sections project downward through and are movable in elongated opening 25' in plate 25.

Projecting from each of cylinders 21 is a valve-casing 38, and extending thereto from the upper and lower ends of the cylinder are ports 39 and 39', also exhaust-port 40. Within the casing is the rotary valve 41 which is open on one side, as indicated at 41' and at its inner end is recessed at 42, the recess being of such form that in one position of the valve, ports 39 and 40 are in register and port 39' is open to the valve-casing through the open-side 41' of the valve, as shown in full lines in Fig. 16, while in another position of the valve, port 39 is open to the valve-casing and ports 39' and 40 are in register through the valve-cavity 42, as indicated in dotted lines in the same figure. The valve is mounted on a stem 43, and the coiled-spring 43' on this stem within the casing holds the valve tightly to its seat. Air under pressure is admitted to the valve-casing through pipe 44. Secured to valve-stem 43 is arm 45, which carries a roller in its outer end for the purpose of riding on the fixed vertically irregular track 46, arranged at one side of the machine on uprights 46'.

Movable vertically within plunger-cylinder 29 is a tube 47, to the lower end of which is secured the plug-rod 48 which normally closes the open lower end 30' of the plunger, as indicated in Fig. 13, said tube and rod being held normally depressed by the coiled spring 49. Tube 47 depends from the inner end of a tubular-arm 50 which projects through slot 29' in cylinder 29, and at its outer end carries a roller 50' which travels over the short fixed track-section 51. Air under pressure is supplied to arm 50 through hose 52, which may conveniently extend from pipe 44.

Movable vertically in the upper portion of the inner end of arm 50 is the ported-valve 53 which is secured to the lower end of stem 54 carrying spring 54' which holds the valve normally raised and the cavity of arm 50 normally closed, as shown in Fig. 13. When however during the pressing operation, arm 50 is raised by its traverse over track 51, as will presently appear, said arm is raised against the pressure of spring 49, and with it tube 47 and plug 48, thus opening the lower end of the plunger, all as shown in Fig. 14. The same movement forces stem 54 upward against piston-rod 22, thereby depressing valve 53 against the pressure of spring 54' and placing the interior of arm 50 in register with tube 47, thus permitting the air under pressure to flow downward through the latter and into the tubular plunger through side apertures 47', and from thence through the open lower end of the plunger for the purpose of expanding the blank.

As the forming parts of the machine rotate with the mold-carrier or table, it is necessary to provide a constantly open rotatable air-connection, and this is accomplished through the medium of the hollow head 55 having a tapered tubular extremity 55' fitting the correspondingly formed upwardly projecting seat 56' carried by cap 56 of the central air-cylinder 3. The head thus rotatably mounted and open to the air-reservoir is held in place by the central bolt 57, the head being thus quite free to turn with the rotating parts of the machine and supply air under pressure thereto while rotating. The pipes 44 extend from this head to the several cylinders as shown and operate to turn the head.

The machine is preferably rotated intermittently, the extent of each movement being preferably sufficient to carry one of the forming mechanisms and the molds therefor entirely through the forming operation. Power may be variously applied for accomplishing this movement. The means here shown consists of a peripheral notched-wheel 58 secured to the lower portion of hollow-post 4, and which is engaged by the reciprocating hook-arm 59. This arm is pivoted to a reciprocating bar 60, with a spring 61 operating to press the arm against wheel 58, causing the arm to engage the wheel notches successively each time it is moved back or inward for a new hold. Bar 60 may be provided with a link 60' for connecting it with crank 62 of a shaft 63, carrying a driving pulley 64. Obviously, the reciprocating bar may be actuated by various means, as may be found most convenient.

As will be understood from the foregoing description, the machine includes a series of separate and distinct forming mechanisms, each having its own mold-mechanism, all of which forming and mold-mechanisms rotate with the carrier, the mechanisms being active successively during a portion only of their movement and inactive during the remainder of their movement or until they again approach, successively, the active position. The machine is here shown equipped with six independently operating mechanisms, but it will be understood that this number may be either increased or diminished as may be thought advisable. The number should be such as to permit of a practically continuous operation and afford a rapid output without the active parts becoming overheated.

The operation is as follows: The intermittent rotary movement of the machine is preferably so timed that at the beginning of each movement one of the forming mechanisms and the mold mechanism therefor is in position to begin its movement past the irregular track 46, as shown in Figs. 1 and 2, in which position press-mold 12 is in line with the raised plunger, and while thus positioned is provided with the proper quota of plastic glass. At the beginning of the advancing movement, valve-arm 45 ascends incline $a$ of track 46, thereby so turning the valve as to cause the forming mechanism, also the neck-mold, to lower and coöperate with press-mold 12 in pressing the glass into a hollow blank, and at the same time completing the neck or upper end of the article, the position of the parts during this operation being shown in Fig. 4, valve-arm 45 being held elevated momentarily while traversing straight portion $b$ of the track. As soon, however, as the arm drops from straight portion $b$ onto depressed track-surface $c$, the valve is so turned as to raise the forming mechanism and the neck-mold, the latter carrying with it the pressed blank, as shown in Fig. 5. With the forming mechanism and blank thus clear of the press-mold, mold-support 7 is given a half turn by the meshing of gear 10 with rack 11, thereby bringing the blow-mold 13 into the plane of the elevated blank and plunger. As here shown, the blow-mold is open during the pressing operation, but the rotary movement of mold-support 7 is just sufficient to carry the slide-actuating pin 18 into groove offset 19' in which it remains during the blowing operation, thus holding the blow-mold tightly closed. By the time the mold-support has been thus shifted, arm 45 has completed its traverse of depressed-surface $c$, and as it is again raised by ascending incline $d$, the pressed blank and the forming mechanism are lowered into the blow-mold, as seen in Fig. 6. At this juncture arm 50 encounters and is raised by its movement over surface 51, thereby opening the lower end of the pressing plunger and establishing a passage for the discharge of air under pressure therethrough, as above described, and as clearly shown in Fig. 14, thereby expanding the blank within the blow-mold and completing the article. The engagement of arm 50 with surface 51 is comparatively short, the blowing being accomplished almost instantly, and as soon as said engagement ceases, arm 50 and the parts connected thereto resume their normal position shown in Fig. 13. After the article has been blown but before arm 49 completes its traverse of the straight elevated track-surface $e$, the neck-mold 31 is released from the formed article by turning hand-lever 37 to the position indicated in dotted lines in Fig. 12, so that when said arm drops from surface $e$ and the forming mechanism and neck-mold are again raised, the completed article remains within the blow-mold, as shown in Fig. 7. As the machine continues its intermittent rotation, gear 10 is caused to traverse another rack 11', which may be arranged at any desired point, and which operates to impart half a revolution to mold-support 7; thus moving pin 18 out of groove offset 19' and opening the blow-mold, as shown at the top of Fig. 2, when the completed article may be readily removed. This movement of the mold-support places the press and blow-molds in the relative positions which they maintain at the time they are next brought into service.

I claim:—

1. The combination of a mold-carrier, press and blow-molds movably mounted on the carrier, pressing and blowing mechanism movable with the carrier, and means for so moving the molds on the carrier as to cause them to coöperate, successively, with the pressing and blowing mechanism.

2. The combination of vertically movable combined pressing and blowing mechanism, press and blow-molds, and automatic means for moving said molds, successively, into and out of line with the pressing and blowing mechanism.

3. The combination of a carrier, press and blow-molds movably mounted thereon, and means actuated by the advancing movement of the carrier for moving the molds successively into operative position, and forming mechanism adapted to coöperate with the molds.

4. The combination of a carrier, a mold-support rotatably mounted thereon, press and blow-molds on the support, means actuated by the advancing movement of the carrier for so turning the mold-support as to place the molds, successively, in operative position, and forming mechanism adapted to coöperate with the molds.

5. The combination of a carrier, a mold-support movable thereon, press and blow-molds on the support, means actuated by the advancing movement of the carrier for so shifting the mold-support as to place the molds, successively, in operative position, forming mechanism movable with the carrier and adapted to coöperate with said molds, successively, and means for causing the forming mechanism and molds to coöperate while they are advancing.

6. The combination of a carrier, press and blow-molds movably mounted thereon, a vertically movable combined pressing and blowing device movable with the carrier, and means operating when said device is elevated for changing the positions of the molds.

7. The combination of a horizontally movable carrier, press and blow-molds thereon, vertically movable pressing and blowing mechanism movable horizontally with the carrier, a vertically and horizontally movable neck-mold, and means operative while the neck-mold is elevated for placing the latter and the press and blow-molds in operative relation successively.

8. The combination of a vertically movable combined pressing and blowing device, a vertically movable neck-mold with which said device coöperates, a horizontally rotatable mold-support, press and blow-molds on the support, and means operating when the neck-mold and pressing and blowing device are elevated for so moving the mold-support as to place the molds successively in operative position.

9. The combination of a horizontally movable carrier, press and blow-molds thereon, vertically movable pressing and blowing mechanism movable horizontally with the carrier, a neck-mold movable horizontally with the carrier and pressing and blowing device and movable vertically with the latter and means operative during the advancing movement of the carrier and while the neck-mold and pressing and blowing device are in elevated position for shifting the position of the press and blow-molds on the carrier.

10. The combination of a carrier, pressing and blowing mechanism adapted to advance simultaneously with the carrier, a neck-mold carried by and movable with the pressing and blowing mechanism, a mold-support rotatably mounted on the carrier, press and blow-molds on the support, means operative while the carrier is advancing for turning the mold-support and placing the molds, successively, in operative position, and means for raising and lowering the neck-mold and pressing and blowing device and for causing said parts to coöperate with the molds during the advancing movement of the carrier.

11. The combination of a horizontally movable carrier, pressing and blowing mechanism movable horizontally therewith, means for moving the pressing and blowing mechanism vertically while the same and the carrier are moving horizontally, a mold-support movable on the carrier, a press-mold and a divided blow-mold on the support, and means operated by the advancing movement of the carrier for changing the positions of the molds and for opening and closing the blow-mold.

12. The combination of a horizontally movable carrier, pressing and blowing mechanism movable horizontally with the carrier, a mold-support rotatably mounted on the carrier, a press-mold and a divided blow-mold on the support, means for so turning the mold-support as to place the molds, successively, in operative position, and means actuated by the turning movement of the support for opening and closing the blow-mold.

13. The combination of a horizontally movable carrier, press and blow-molds movably mounted on the carrier, forming mechanism movable with the carrier, a vertically movable support for the forming mechanism, a fixed irregular surface past which the carrier moves, an operative connection between the supporting mechanism and said surface constructed and arranged to cause the forming mechanism to lower when passing certain portions of said irregular surface and to cause the same to raise when passing other portions of said surface, and mechanism operating while the carrier is in motion and while the forming mechanism is raised to change the position of the molds on the carrier.

14. The combination of a horizontally movable mold-carrier, a mold, a cylinder movable horizontally with the carrier and provided with a piston, forming mechanism actuated by the piston, a valve for the cylinder, and fixed valve-actuating means past which the cylinder moves.

15. The combination of a horizontally movable carrier, molds thereon, a cylinder movable horizontally with the carrier and provided with a piston, forming mechanism actuated by the piston, a valve for the cylinder, a fixed surface of irregular form past which the cylinder moves, and a movable connection between said surface and the valve for actuating the latter.

16. The combination of a horizontally movable carrier, press and blow-molds movably mounted thereon, pressing and blowing mechanism movable horizontally with the carrier, a cylinder and piston for vertically reciprocating the pressing and blowing mechanism, a valve for the cylinder, an arm for moving the valve, a fixed surface over which the arm moves, said surface having two raised portions separated by a depressed portion, said arm being adapted when traversing the raised surfaces to so move the valve as to lower the pressing and blowing mechanism and when traversing the depressed surface to so move the valve as to raise said mechanism, and means operating while the arm is moving over said depressed surface to move the press-mold out of and the blow-mold into operative position.

17. In a glass-forming machine, the combination of a hollow pressing plunger open at its lower end, an air connection for the plunger, a device within the plunger for normally closing said end, and means adapted to be actuated by the downward movement of the plunger for opening said closing device.

18. In a glass forming machine, the combination of a hollow plunger open at its lower end, a device normally closing said open end, a normally closed air-connection, and means opening said closing device and simultaneously establishing communication between the plunger and the air-connection.

19. In a glass forming machine, the combination of a hollow plunger open at its lower end, a tubular device within the plunger and open thereto, a plug carried by the tubular device for normally closing the open end of the plunger, a laterally extending air-connection carried by and normally out of communication with said tubular device, and means actuated by the downward movement of the plunger for raising said plug and simultaneously establishing communication between said tubular device and the air-connection.

20. The combination of a hollow plunger open at its lower end, a closing device for the lower end thereof, an air-connection for the plunger, press and blow-molds which the plunger fits interchangeably and with which it coöperates successively, and means operating while the plunger is within the blow-mold for opening its lower end through which air discharges.

21. The combination of press and blow-molds, a hollow plunger open at its lower end and adapted to fit said molds interchangeably, a closing device for the open end of the plunger, means for raising and lowering the plunger, a normally closed air-connection for the plunger, and means operating while the plunger is lowered within the blow-mold for opening the lower end of the plunger and simultaneously opening said air-connection.

22. The combination of a horizontally movable carrier, press and blow-molds thereon, mold shifting means, a combined pressing and blowing plunger fitting the molds interchangeably, the plunger being movable horizontally with the carrier, means for raising and lowering the plunger, the plunger being hollow and having an air-discharge opening, a closing device for the plunger-opening, and means operating while the plunger is within the blow-mold to open said closing device.

23. The combination of a horizontally movable carrier, press and blow-molds thereon, mold shifting means, a combined pressing and blowing plunger fitting the molds interchangeably, plunger raising and lowering means, the plunger being hollow and movable horizontally with the carrier and open for the discharge of air, a vertically moving closing device within the plunger for the open lower end thereof, an air-connection for the plunger, and a fixed device past which the plunger moves while within the blow-mold, said fixed device operating to raise the closing device and open the plunger for the discharge of air.

24. In a glass forming machine, the combination of a divided mold, oppositely moving slides upon which the mold-sections are mounted, the slides being formed to overlap each other at the ends, and gears interposed between and engaging said overlapping portions for moving the slides toward and from each other.

25. In a glass forming machine, the combination of a divided mold, opposite moving slides upon which the mold-sections are mounted, one end of each slide having a lateral extension which overlaps the unextended end of the other slide, and gears interposed between and meshing with the slide-ends in said extensions for moving the slides toward and from each other.

26. In a glass forming machine, the combination of a base having a cam-groove, a mold-support rotatable on the base, a divided mold, overlapping slides on the support to which the mold-sections are secured, a pin depending from one of the slides into the cam-groove of the base, and gears interposed between the slides, whereby when the slide carrying the pin is moved through the medium of the cam-groove the other slide is moved in the opposite direction.

27. The combination of a neck-mold support, slides thereon, mold-sections secured to the slides, gears interposed between the slides whereby the movement of one of the slides operates to move the other slide in a reversed direction, a pin projecting from one of the slides, and an operating lever having a cam-slot into which the pin projects.

28. The combination of a rotatable mold-carrier, molds, a support above and rotatable with the carrier, and forming mechanism secured to and sustained by the support.

29. The combination of a rotatable mold-carrier, molds, a central support above and rotatable with the carrier, and forming mechanism secured to and sustained by the support and overhanging the carrier.

In testimony whereof I affix my signature in presence of two witnesses.

ALVIN S. REICHEL.

Witnesses:
GARRET S. TITUS,
A. D. FRANKENBERRY.